May 24, 1927.
E. C. HUTCHINSON
1,630,012
ART OF ATTACHING RUBBER SEAL RINGS IN METAL CONTAINERS
Filed Aug. 25, 1925
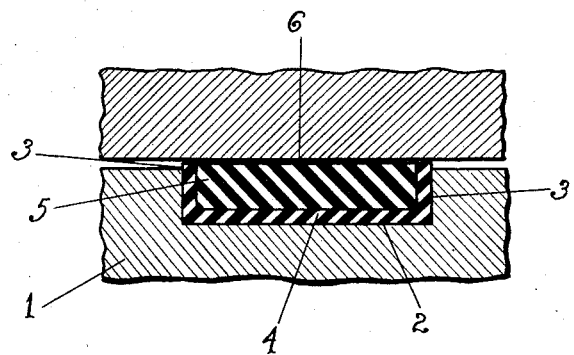
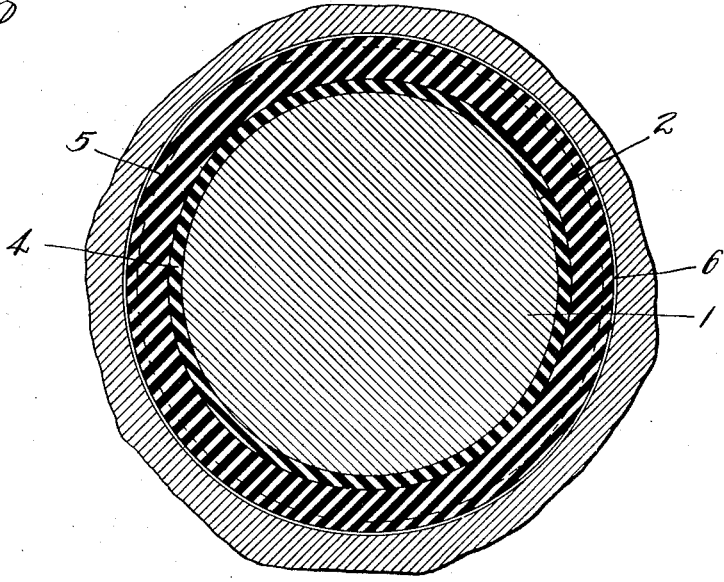
INVENTOR
Ely C. Hutchinson
BY
Harry H. Totten
ATTORNEY Patented May 24, 1927.

1,630,012

UNITED STATES PATENT OFFICE.

ELY C. HUTCHINSON, OF OAKLAND, CALIFORNIA, ASSIGNOR TO THE PELTON WATER WHEEL CO., OF SAN FRANCISCO, CALIFORNIA, A CORPORATION OF CALIFORNIA.

ART OF ATTACHING RUBBER-SEAL RINGS IN METAL CONTAINERS.

Application filed August 25, 1925. Serial No. 52,371.

The present invention relates to an improvement in the art of attaching rubber seal rings firmly within their metal seats in hydraulic prime movers of that type illustrated in application Serial Number 697,744, filed March 8th, 1924.

Heretofore it has been the practice in vulcanizing or permanently attaching rubber insertions to their metal containers to place a layer of hard rubber within the bottom of the container groove, the same being held firmly thereto by means of cementing material. In turn softer rubber is vulcanized to the layer of hard rubber. Due to the fact that it has been found impossible to vulcanize the rubber into the container in such a way that when cooled the rubber face will be the exact diameter necessary for a proper fit between the rotary surface of the turbine runner and the stationary rubber surface, because of shrinkage of said surface while cooling, it is necessary that the rubber face be trued by some process such as grinding.

In preventing the metal surface of the rotating runner from contacting with any metal on the stationary rubber container it was necessary that the metal sides to the groove in which the rubber wing was fastened be cut backward from the wearing surface of said ring. Under the system previously used the work entailed in the finishing of the rubber surface and the under cutting of the metal container, as above stated, resulted in the loosening of the rubber at the edges where the rubber extends from the container. The exposed portion of the rubber ring is also subject to the hydraulic pressure inside the turbine casing, and as a result of the partial loosening of said ring by the machining process and the pressure against the portion of the ring extending from the container, in combination with other conditions incident to operation, the rubber ring has at times been pressed loose from its fastening, torn in portions and stripped from its container groove.

It is therefore the object of the present invention to provide a flexible ring construction in which the face of the metal container may be machined up to contact of the cutting tool with the rubber ring, without the danger of tearing the rubber away from its metal container or injuring the joint between the rubber and metal. Still a further object is to provide a construction for protecting that portion of the rubber ring extending beyond the container face against the hydraulic pressures within the turbine casing, thus offering increased resistance against the stripping action heretofore mentioned.

These objects are attained by the vulcanizing of the soft or wearing portion of the rubber seal ring into a metal groove, in such a manner that a hard rubber shell extends not only across the back or base of the groove in the metal container but on the sides of said groove, to a point flush or nearly so with the wearing surface of the rubber ring.

With the above mentioned and other objects in view, the invention consists in the novel combination of parts hereinafter described, illustrated in the accompanying sheet of drawings and set forth in the claims hereto annexed, it being understood that various changes in form, proportion, size and minor details of construction within the scope of the claims may be resorted to without departing from the spirit or sacrificing any of the advantages of the invention.

In the accompanying drawing—

Figure 1 is a view in cross section of portions of relatively movable opposing walls of a hydraulic prime mover construction, illustrating the preferred embodiment of my improved sealing ring construction.

Fig. 2 is a transverse vertical sectional view through the illustration Fig. 1, illustrating the embodiment of my invention in connection with rotating bodies.

Referring to Fig. 1, wherein the numeral 1 indicates one of the elements of a hydraulic prime mover, the face thereof being provided with a circumferential grove 2. Within the groove 2 is positioned a channeled substantially U-shaped base 4, preferably of hard rubber and the back and side walls of which are cemented to the walls of the groove 2. Within the member 4 is vulcanized a soft rubber seal ring 5, the face of which projects into close proximity to the face of the opposing member 6 of the hydraulic prime mover. It will be noted that the side walls of the hard rubber base 4 extend to a point beyond the face of the metal container and terminate flush or approximately flush with the wearing surface 6 of the rubber ring 5.

This construction of encasing the soft rubber ring within a hard rubber shell reinforces the side walls of the ring, and protects the ring from becoming loosened by contact of the cutting tool with the ring 5, when the face of the container is machined up. Said construction also protects the portion of the ring extending beyond the face of the container from hydraulic pressures within the turbine.

I claim:—

1. In a hydraulic turbine comprising relatively moving parts positioned with co-operating surfaces in opposing relation and one surface provided with a continuous groove, the combination with a sealing ring construction within said groove and comprising a nonmetallic elastic flexible body projecting beyond the edge of the groove into close proximity to the opposing surface, and a one piece nonmetallic channel shaped body mounting said flexible body and within which said flexible body is vulcanized, said channel shaped body disposed with its side walls extending outwardly from said groove beyond the surface of the grooved part and in contact with the side walls of the flexible body for reinforcing the same, said channel shaped body being rigidly and permanently seated within said groove.

2. In a hydraulic turbine consisting of relatively moving parts positioned with co-operating surfaces in opposing relation and one surface provided with a continuous groove, the combination with a sealing ring construction within said groove and comprising a substantially U-shaped hard rubber base seated and cemented within the groove with its side walls projecting outwardly beyond the surface of said grooved part, and a soft rubber body vulcanized within said rubber base with its surface extending to the edges of the hard rubber base.

In testimony whereof I have signed my name to this specification.

ELY C. HUTCHINSON.